US012568562B1

(12) United States Patent
Xu et al.

(10) Patent No.: US 12,568,562 B1
(45) Date of Patent: Mar. 3, 2026

(54) LED DRIVE SYSTEM, LED DRIVE METHOD AND LED LAMP THEREOF

(71) Applicant: SHENZHEN SNC OPTO ELECTRONIC CO., LTD, Shenzhen (CN)

(72) Inventors: Jianyong Xu, Shenzhen (CN); Hui Gu, Shenzhen (CN)

(73) Assignee: SHENZHEN SNC OPTO ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 19/243,208

(22) Filed: Jun. 19, 2025

(51) Int. Cl.

| | |
|---|---|
| ***H05B 45/3725*** | (2020.01) |
| ***F21V 23/06*** | (2006.01) |
| ***F21V 31/00*** | (2006.01) |
| ***F21Y 115/10*** | (2016.01) |
| ***H05B 45/10*** | (2020.01) |
| ***H05B 45/325*** | (2020.01) |
| ***H05B 47/11*** | (2020.01) |
| ***H05B 47/12*** | (2020.01) |
| ***H05B 47/13*** | (2020.01) |
| ***H05B 47/17*** | (2020.01) |
| ***H05B 47/18*** | (2020.01) |

(52) U.S. Cl.
CPC ......... *H05B 45/3725* (2020.01); *F21V 23/06* (2013.01); *F21V 31/005* (2013.01); *H05B 45/10* (2020.01); *H05B 45/325* (2020.01); *H05B 47/11* (2020.01); *H05B 47/12* (2020.01); *H05B 47/13* (2020.01); *H05B 47/17* (2020.01); *H05B 47/183* (2024.01); *H05B 47/184* (2024.01); *F21Y 2115/10* (2016.08)

(58) Field of Classification Search
CPC .... H05B 47/184; H05B 47/183; H05B 47/17; H05B 47/13; H05B 47/12; H05B 47/11; H05B 45/3725; H05B 45/325; F21Y 2115/10; F21V 31/005; F21V 23/06
See application file for complete search history.

(56) References Cited

U.S. PATENT DOCUMENTS

| | | | | |
|---|---|---|---|---|
| 6,415,205 | B1 * | 7/2002 | Myron | G08B 29/183 700/275 |
| 11,394,426 | B2 * | 7/2022 | Kearney | H04B 3/54 |
| 2003/0065472 | A1 * | 4/2003 | Eckel | H05B 47/13 702/130 |
| 2018/0138945 | A1 * | 5/2018 | Kearney | G05B 15/02 |

* cited by examiner

*Primary Examiner* — Raymond R Chai
(74) *Attorney, Agent, or Firm* — Hemisphere Law, PLLC

(57) ABSTRACT

The present disclosure provides an LED drive system and an LED drive method thereof, the LED drive system configured to simultaneously access a plurality of detection control modules, and process detection signals of the plurality of detection control modules that is accessed, and convert into adjustment signals with unified formats and the same output terminals thereof, and then configured to control and adjust a drive power supply through the adjustment signals, and finally the drive power supply connected to an illumination module inside an LED lamp, to solve technical problems that the plurality of conventional detection control modules are incompatible. When both the detection control module and the drive power supply are set in a pluggable LED controller, the LED controller is plugged into the LED lamp through a specific plugging way to directly and electrically connect to the illumination module, to achieve unity and compatibility of the LED lamp.

16 Claims, 11 Drawing Sheets

LED drive system 900

LED DRIVE SYSTEM, LED DRIVE METHOD AND LED LAMP THEREOF

TECHNICAL FIELD

The present disclosure relates to the field of LED illumination devices, and especially relates to an LED drive system, an LED drive method and an LED lamp with the LED drive system thereof.

BACKGROUND

An LED lamp with a NEMA (National Electrical Manufactures Association) plug is generally used in a public area such as a road lamp, a parking lot and a ball field. Such LED lamp includes a light-emitting element, a heat dissipation element and a driving element. The driving element is configured to obtain an external drive power supply, which is usually from the mains network, such as an AC power of 110V and 50 HZ. The driving element controls the light-emitting element to emit light based on an obtained electrical energy thereof, while the light-emitting element generates heat during emitting light. The heat dissipation element dissipates heat generated by the light-emitting element during emitting light to provide the best light emission working state. When the driving element drives the light-emitting element to emit light, it needs to rely on a sensor inside the NEMA plug to determine a way that emits light. The NEMA plug is generally plugged into the LED lamp and electrically connected with the light-emitting element, sends detection signals that are detected by the sensor to the light-emitting element, and then controls the LED lamp.

Different sensors have different data protocols, so that the different sensors require different numbers of cables to transmit the detection signals. So, according to the different data protocols that are detected, the NEMA plugs require pins for transmitting the detection signals, which results in the NEMA plugs having different numbers of data transmission pins based on the number of sensors, such as three pins, five pins and seven pins. Due to the different number of pins, the NEMA plugs have lower compatibility with the LED lamps, for example, a 5-pin NEMA interface is reserved on a housing of the LED lamp, which is electrically connected to the internal light-emitting element of the LED lamp through a point-conduction way thereof. When the NEMA plug is plugged into the LED lamp, a 5-pin NEMA plug should be provided to be plugged in; in addition, the 5-pin NEMA plug only corresponds to one type of data transmission protocol, which means that the LED lamp can only be compatible with one sensor or obtain one control protocol, so that a low compatibility is occurred. If the LED lamp has the same external structure and the same internal control, a difference lies in the NEMA plug and the sensor inside the NEMA plug, in this way, it is necessary to design a plurality of housings with different NEMA interfaces that are reserved, as well as internal circuit control boards for the light-emitting elements that receive the detection signals through pins, which will inevitably cause waste in use and increase a cost of developing the LED lamps with multiple interfaces thereof.

Detection control modes of conventional NEMA plugs include:

firstly, continuously adjustment of 0-10V analog control signals, adjusting a specific value of a voltage of 0-10V, to achieve a control of a current that is output from the drive power supply, thereby controlling a brightness of the light-emitting element thereof;

secondly, a light sensitive detection, detecting an ambient light, converting the ambient light into a photocurrent, and controlling a lighting mode of the drive power supply based on a magnitude of the photocurrent;

thirdly, a voice control, detecting a sound of an environment, recognizing the sound that is input, converting the sound into a control electrical signal, and using the control electrical signal to control the lighting mode; and fourthly, in addition, it also includes controls of a DALI (Digital Addressable Lighting Interface), a DMX (Digital Multiplex) and a PIR (Passive Infrared Sensor) infrared, etc.

Therefore, how to standardize the various detection and control modes mentioned above into a unified new NEMA plug, which has a unified output pin is an urgent technical problem that needs to be solved, regardless of types of the sensors or the detection protocols that are set inside.

In addition, according to actual requirements, different receivers and different sensors need to be added to the NEMA plug of the LED lamp. For example, one customer only needs to support for a DALI receiver in the NEMA plug, and the other customer needs to support for a DALI receiver and an infrared sensor within the NEMA plug. At this time, the driving elements inside the LED lamp are different, so that the LED lamps need to be equipped with a plurality of driving elements that support for different control modes according to the different NEMA plugs, which will inevitably affect an internal structure and a spatial size design of the LED lamp, and also reduces the compatibility of the LED lamp. It is known that the LED lamp at least includes the drive power supply and an illumination module connected to the drive power supply. The illumination module includes a lighting board and LED beads connected to the lighting board, the lighting board connected to the drive power supply through an interface.

In the related art, the drive power supply is set inside the LED lamp. When the receivers and the sensors supported by the NEMA plug are different, different drive power supplies set inside the LED lamp is unable to be electrically connected to the NEMA plug to achieve corresponding functions. How to solve the compatibility problem between the NEMA plugs and the driver power supplies is also a technical issue that needs to be solved.

SUMMARY

The technical problems to be solved: in view of the shortcomings of the related art, an objective of the present disclosure is to provide an LED drive system which can be compatible with a plurality of detection control modules as well as data control protocols, uniformly output adjustment signals with the same output formats and/or the same output terminals, and control a drive power supply to achieve compatible output through the adjustment signals.

An LED drive system according to an embodiment of the present disclosure includes a drive power supply, an LED controller installed with an LED lamp in a plug-in manner, wherein when the LED controller is plugged, the LED controller obtains a power from the LED lamp to start working; and wherein:

the LED controller includes:

a plurality of detection control modules is different with each other and configured to generate detection control signals to output or receive detection control signals to output, and the detection control signals output by the plurality of detection control modules are different;

a switching adjustment module;

a detection calculation module connected to both the switching adjustment module and the detection control module in a conductive manner, and configured to one of a plurality of detection control signals output from the plurality of detection control modules to be received under an adjustment trigger of the switching adjustment module, and converts the detection control signal that has been received into an adjustment signal to output to the drive power supply, the drive power supply configured to drive a lighting mode and a lighting intensity of the LED lamp according to the adjustment signal that has been received; and wherein when the detection control signals that are received by the detection calculation module come from different detection control modules, the adjustment signals output from the detection calculation modules have the same output formats and/or the same output terminals to achieve compatibility of the plurality of detection control modules.

In the LED drive system of the present disclosure, the plurality of detection control modules has different types, such as the DALI signal module that receives a DALI signal, or a PIR signal module that includes an infrared sensor. The detection control module can receive detection control signals or generate the detection control signals through its own monitor thereof, and then output the detection control signals to the detection calculation module. The detection calculation module can selectively obtain one or more detection control signals based on preset switching adjustment rules within the detection calculation module according to the adjustment trigger of the switching adjustment module, and then, the obtained detection control signals will be processed and converted into the adjustment signals to output to the drive power supply. And output methods and rules that the adjustment signals itself does not have, that is, the adjustment signals will not show different behaviors according to different detection control signals, so that no matter which detection control module sends the detection control signal is received by the front-end, the adjustment signal can be obtained and recognized by the drive power supply, thereby achieving compatible detection of the plurality of detection control modules, and controlling the driving mode of the LED lamp.

An LED drive method according to an embodiment of the present disclosure is provided and configured to determine a plurality of detection control signals, and determine the detection control signals that have been received, and then convert the detection control signals into adjustment signals with the same data output formats or the same data output terminals, according to control modes of the detection control signals, and output the adjustment signals to the drive power supply, thereby achieving a control of the drive power supply and solving the technical problem of the plurality of detection control modules being incompatible with each other in the related art.

Wherein the drive method can be compatible with inputting the plurality of different detection control signals, and then outputting the adjustment signals with the same output formats, thereby achieving a compatibility purpose of the plurality of detection control modules.

An LED lamp according to an embodiment of the present disclosure includes a LED controller that is detachably installed on the LED lamp in a plug-in manner, the LED controller including a plurality of detection control modules, the LED controller configured to detect detection control signals of the plurality of detection control modules, convert the detection control signals into adjustment signals with the same output formats and the same output terminals to be output, and then output the adjustment signals to the drive power supply, thereby achieving compatibility of the plurality of detection control modules and enabling the plurality of detection control modules to control the drive power supply.

Furthermore, the drive power supply, the detection control module, the switching adjustment module, and the detection calculation module are all arranged inside the LED controller. The LED controller is connected to the body through the connecting seat, and an illumination module is installed inside the body. At this time, the illumination module can only include basic structures of a lighting board and lighting beads, the driving part (such as the drive power supply), a detection part (such as the detection control module), and a control part (such as the switching adjustment module and the detection calculation module) of the LED lamp are all within the LED controller, which can minimize a cost, a complexity and a failure rate of the LED body. The control part, the detection part and the driving part with a high failure rate are all set inside the LED controller, and connected to the illumination module inside the body through a plug-in connection way. This way, in case of failures, only the LED controller needs to be removed and replaced, which results in maintenance more convenient.

Moreover, customized settings with different numbers of detection control modules can be made according to customer requirements, and the plurality of detection and control modules can also be compatible within the LED controller through the detection calculation module, which results in functions and designs of the entire LED lamp more flexible.

DETAILED DESCRIPTION

Figure 1:
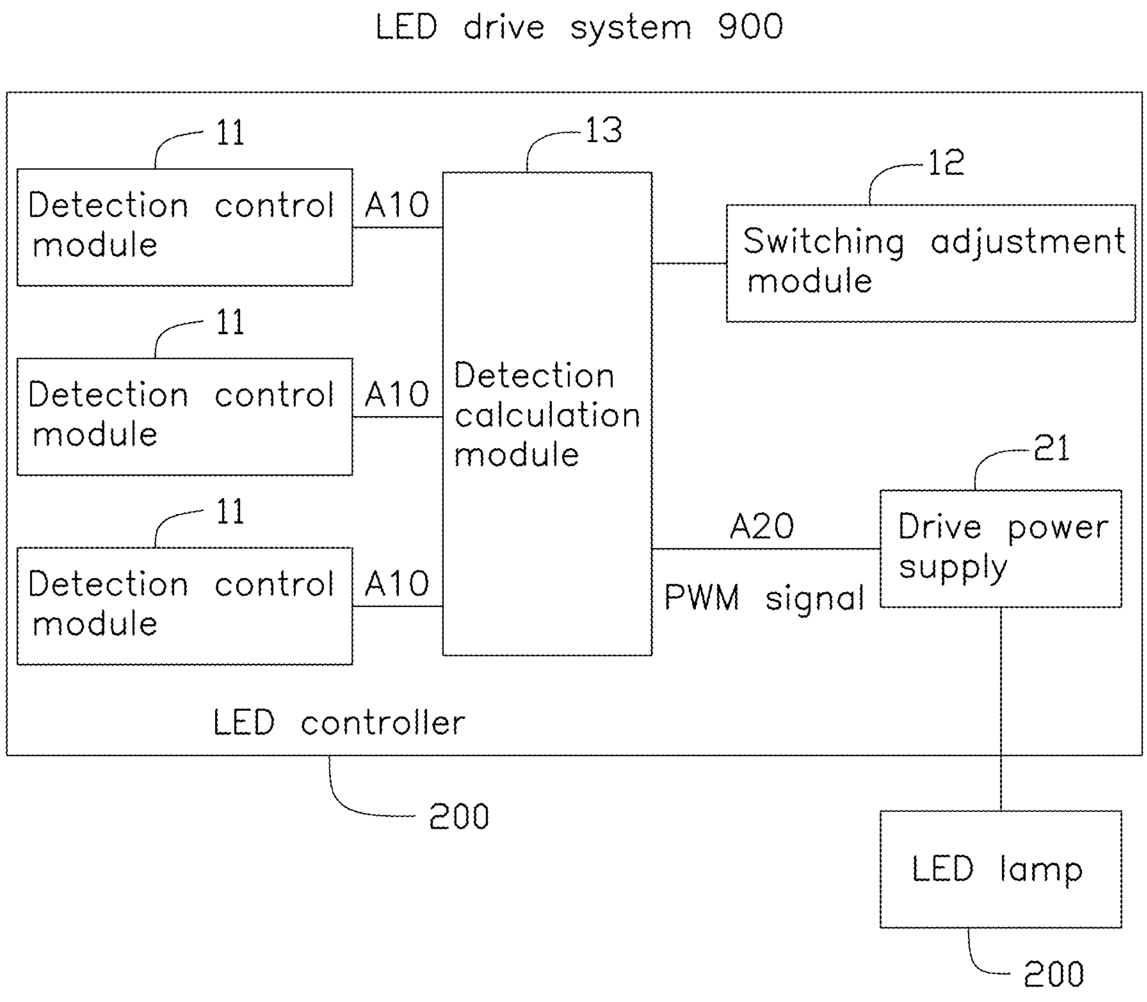
FIG. 1 is a diagram of an LED drive system in accordance with an embodiment of the present disclosure.

Referring to FIG. 1, the present disclosure provides an LED drive system 900 including a drive power supply 21, and an LED controller 100 installed with an LED lamp 200 in a plug-in manner. When the LED controller 100 is plugged in, the LED controller 100 can obtain a power from the LED lamp 200 to start working. A control of the drive power supply 21 includes outputting a driving signal with a driving mode and a driving intensity to control a lighting mode and a lighting intensity of the LED lamp 200.

The driving mode includes: a high level continuous, a low level continuous, a high level and a low level alternative with each other, and controlling a switching time interval between high and low levels, such controls of the driving signals enable the lighting mode of the LED lamp 200 to be controlled, resulting in the LED lamp 200 presenting:

lighting, extinguishing, a timed shutdown, turning off first and then turning on, turning on for three minutes and turning off for one minute and then turning on again, etc. The driving intensity is achieved through controlling the adjustment signal synchronously output by the driving signal. For example, when the adjustment signal is a PWM signal, a duty cycle of the PWM signal is adjusted to control a current of the PWM signal, thereby using the current to adjust the lighting intensity of the LED lamp 200. An adjustment of the driving intensity refers to control a working power of the LED lamp 200 when the LED lamp 200 is lit up, such as a full power, a power of 15%, and a power of 80%, etc. The power corresponds to an illumination intensity of the LED lamp 200.

The LED controller 100 includes a detection control module 11, a switching adjustment module 12, a detection calculation module 13 and the drive power supply 21.

There is a plurality of detection control modules 11, such as a PIR signal module configured to detect infrared signals, and a DALI signal module configured to receive DALI signals. That is to say, two or more detection control modules 11 are different from each other, which include different functions, different signal acquisition, and different signal output and signal generation. Different detection control modules 11 correspond to different detection directions or control data sources. That is, the detection control module 11 is configured to generate or receive detection control signals and then output the detection control signals, and the plurality of detection control modules 11 output different detection control signals.

In an embodiment of the present disclosure, the detection calculation module 13 is connected to both the switching adjustment module 12 and the detection control module 11 in a conductive manner, and configured to select the detection control signal A10 to be received under an adjustment trigger of the switching adjustment module 12, and then convert the detection control signal A10 into an adjustment signal A20 to output to the drive power supply 21.

Figure 2:
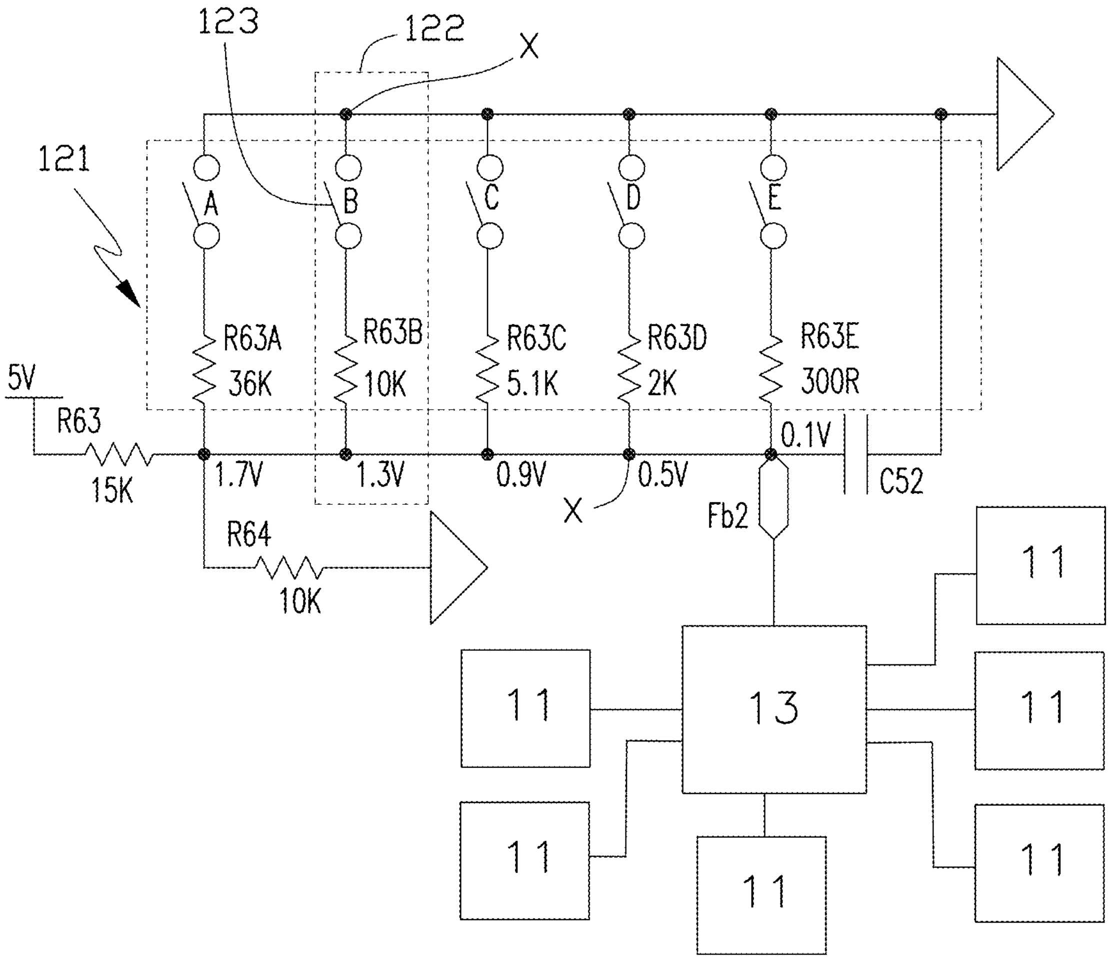
FIG. 2 is a schematic circuit connection diagram of a switching adjustment module of the LED drive system of FIG. 1.

Referring to FIG. 2, one of the simplest ways is that the switching adjustment module 12 is an adjusting switch 121 with a plurality of different gears (A-E) that can emit different triggering signals, such as different voltages (1.7V, 1.3V, 0.9V, 0.5V, 0.1V). When the detection calculation module 13 receives a trigger voltage value output from the switching adjustment module 12, it can select a corresponding detection control signal A10 that is sent from the plurality of detection control modules 11 which is connected to the detection calculation module 13 by identifying the voltage value. Based on the detection control signal A10, the adjustment signal A20 is generated to drive and control the drive power supply 21, which achieves compatibility of the plurality of detection control modules 11 by the detection calculation module 13.

Specifically, the switching adjustment module 12 is configured to adjust and trigger the detection calculation module 13, so that the detection calculation module 13 can select one of the plurality of detection control signals A10 to process and convert into the corresponding adjustment signal A20.

The switching adjustment module 12 is configured to adjust an own resistance value thereof by the above way, to output voltages with different sizes, the adjustment way can be achieved by the adjusting gears (A-E).

Specifically, the switching adjustment module 12 includes a plurality of adjusting branches 122 connected in parallel to each other, a control output terminal (Fb2) is formed at an end of a parallel connection point X thereof and configured to output the voltages with different sizes (1.7V, 1.3V, 0.9V, 0.5V, 0.1V) to the detection operation module 13. The number of adjusting branches 122 is the same as that of detection control modules 11, and each adjusting branch 122 corresponds to one detection control module 11.

The adjusting branch 122 includes a conductive switch 123 and an adjusting resistor (R63A-R63E) connected in series to the conductive switch 123, a plurality of conductive switches 123 are combined to form an adjusting switch 121, wherein the adjusting resistors (R63A-R63E) of the plurality of adjusting branches 122 have different values from each other, wherein when the conductive switch 123 is turned off and the corresponding adjusting branch 122 is turned on, and the adjusting branch 122 that is turned on outputs a corresponding voltage (1.7V, 1.3V, 0.9V, 0.5V, 0.1V) to the detection calculation module 13.

Referring to FIG. 1, in the present disclosure, when the detection control signals A10 input by the detection calculation module 13 come from different detection control modules 11, the adjustment signals A20 output from the detection calculation module 13 have the same output formats and/or the same output terminals to achieve compatible data output thereof.

In the present disclosure, the adjustment signals A20 are all output through PWM modulation signals, the PWM modulation signals can modulate and control the driving intensity and/or the driving mode of the drive power supply 21, thereby indirectly controlling the illumination intensity and/or the lighting mode of the LED lamp 200.

In an embodiment of the present disclosure, regardless of whether two or more types of detection control modules 11 are provided, at this time, the plurality of detection control modules 11 are connected to the detection calculation module 13, and at the same time, adjusting switches 121 with adjusting gears corresponding to the number of detection control modules 11 are set to form the switching adjustment module 12. The switching adjustment module 12 is also connected to the detection calculation module 13. When the adjusting switch 121 is turned on, a voltage output from the conductive adjusting gear is different from the voltage output from other non-conductive adjusting gears. The detection calculation module 13 is configured to identify the voltage to determine which detection control module 11 is accessed, and then receive the detection control signal A10 output from the detection control module 11 that is identified. After identifying the detection control signals A10 that is received, a final driving mode and a final driving intensity can be determined. And then, according to the driving mode and the driving intensity, the corresponding adjustment signal A20 is output. After the adjustment signal A20 is output to the drive power supply 21, the driving mode and the driving intensity of the drive power supply 21 can be controlled, thereby realizing a control of the LED lamp 200 by the plurality of detection control modules 11, as well as the compatibility control of the plurality of detection control modules 11 through the detection calculation module 13.

In an embodiment of the present disclosure, the adjustment signal A20 adopts a unified PWM modulation signal to ensure the uniformity of output control data and achieve compatibility with the detection control module 11. At the same time, the PWM modulation signal is output to the drive power supply 21 through a fixed number of output terminals thereof, such as a unique control mode input terminal of the drive power supply 21. In this case, the drive power supply 21 only needs to uniquely identify the adjustment signal A20 from a specific terminal, without respectively distinguishing the detection control signals A10 with different data protocols and different input terminals output from the plurality of detection control modules 11, thereby achieving compatible control of the plurality of detection control modules 11.

Figure 3:
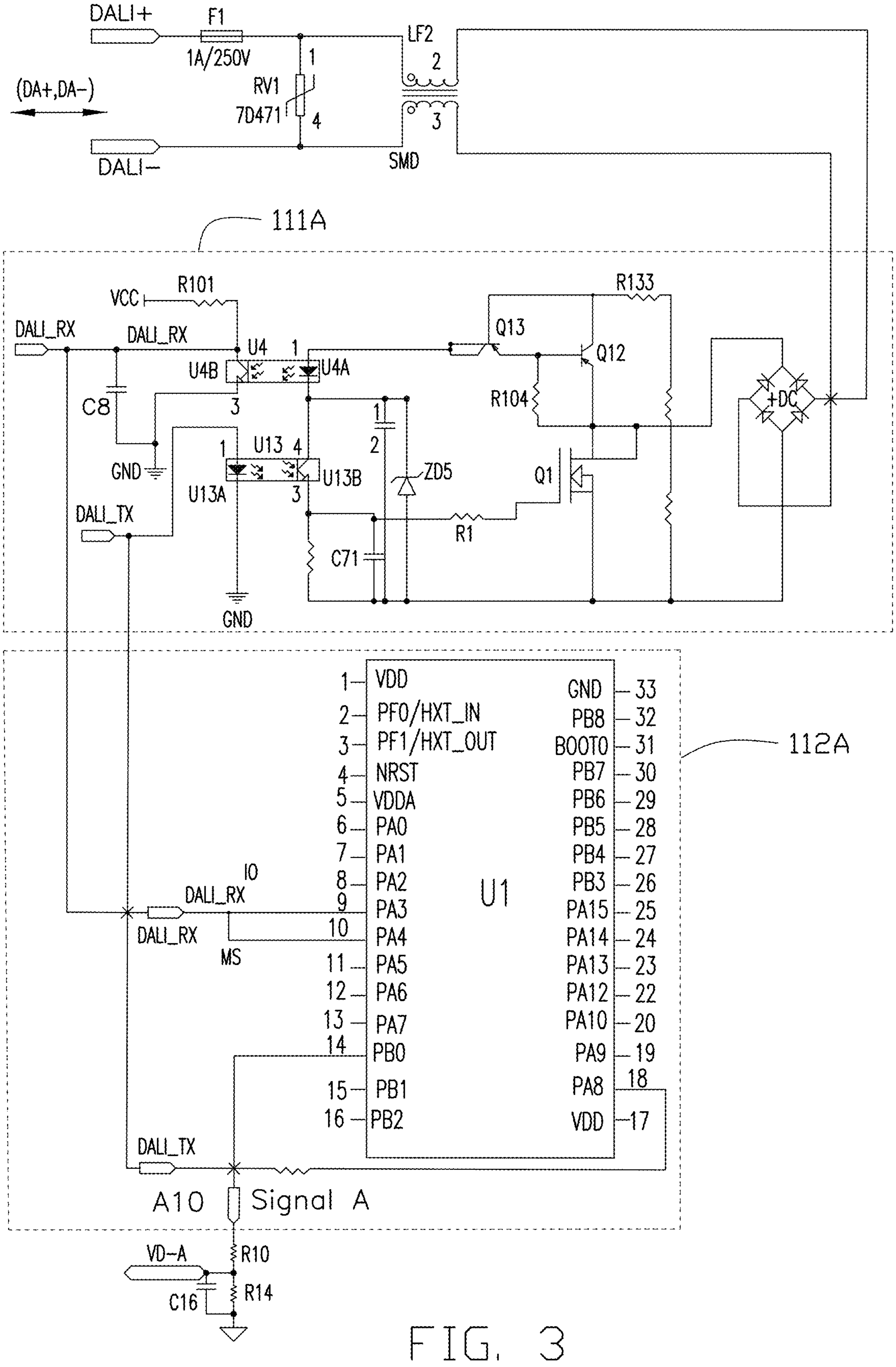
FIG. 3 is a schematic circuit diagram of a DALI signal module of the LED drive system of FIG. 1.

Referring to FIG. 3, in the present disclosure, the detection control module 11 includes a DALI (Digital Addressable Lighting Interface) signal module 11A, the DALI signal module 11A including: DALI input terminals (DALI+, DALI−), a DALI pre-processing module 111A and a DALI data conversion module 112A.

The DALI input terminals (DALI+, DALI−) are configured to receive DALI signals (DA+, DA−) that comply with a DALI protocol. The DALI input terminals (DALI+, DALI−) can be connected to a circuit of a DALI control box through an interface, and receive the DALI signals (DA+, DA−) sent from the DALI control box. A plurality of LED controllers 100 is connected to one DALI control box, so that one DALI control box can control the plurality of LED controllers 100 and the LED lamp 200.

The DALI pre-processing module 111A is configured to perform optocoupler isolation on the DALI signals (DALI+, DALI−) and achieve time-division asynchronous bidirectional communication, to generate an asynchronous signal thereof. As shown in FIG. 3, two optocoupler elements (U4, U13) conduct alternately under a conduction control of a MOS transistor (Q1), thereby achieving bidirectional asynchronous communication thereof. The optocoupler isolation can achieve impedance isolation between an optocoupler front-end data and an optocoupler back-end data, to prevent an interference between the front-end and back-end circuits, and improve anti-interference ability thereof. The DALI signals (DA+, DA−) are bidirectional communication data, which communicate with the DALI control box through asynchronous bidirectional communication in a time-sharing manner. Such communication method meets a requirement of the DALI protocol, thereby realizing an input and an output of the DALI signals.

The DALI data conversion module 112A is configured to receive or output the asynchronous signals (DALI_RX, DALI_TX) to achieve a communication with input terminals (DALI+, DALI−), and convert the asynchronous signals (DALI_RX, DALI_TX) that are received into the detection control signals A10 to output the detection control signals A10. The detection control signal output from the DALI data conversion module 112A is defined as a first signal (signal A).

In the DALI signal module 11A, the DALI data conversion module 112A is configured to output the first signal (signal A) that includes information corresponding to a lighting mode and a lighting intensity according to the DALI signals (DA+,DA−) or the asynchronous signals (DALI_RX,DALI_TX) corresponding to the lighting mode and the lighting intensity. That is to say, the first signal (signal A) that is output contains all control information of the DALI signals and will not cause a change of the control mode of the LED lamp 200 after converting the DALI signal (DA+, DA−) into the first signal (signal A).

Figure 4:
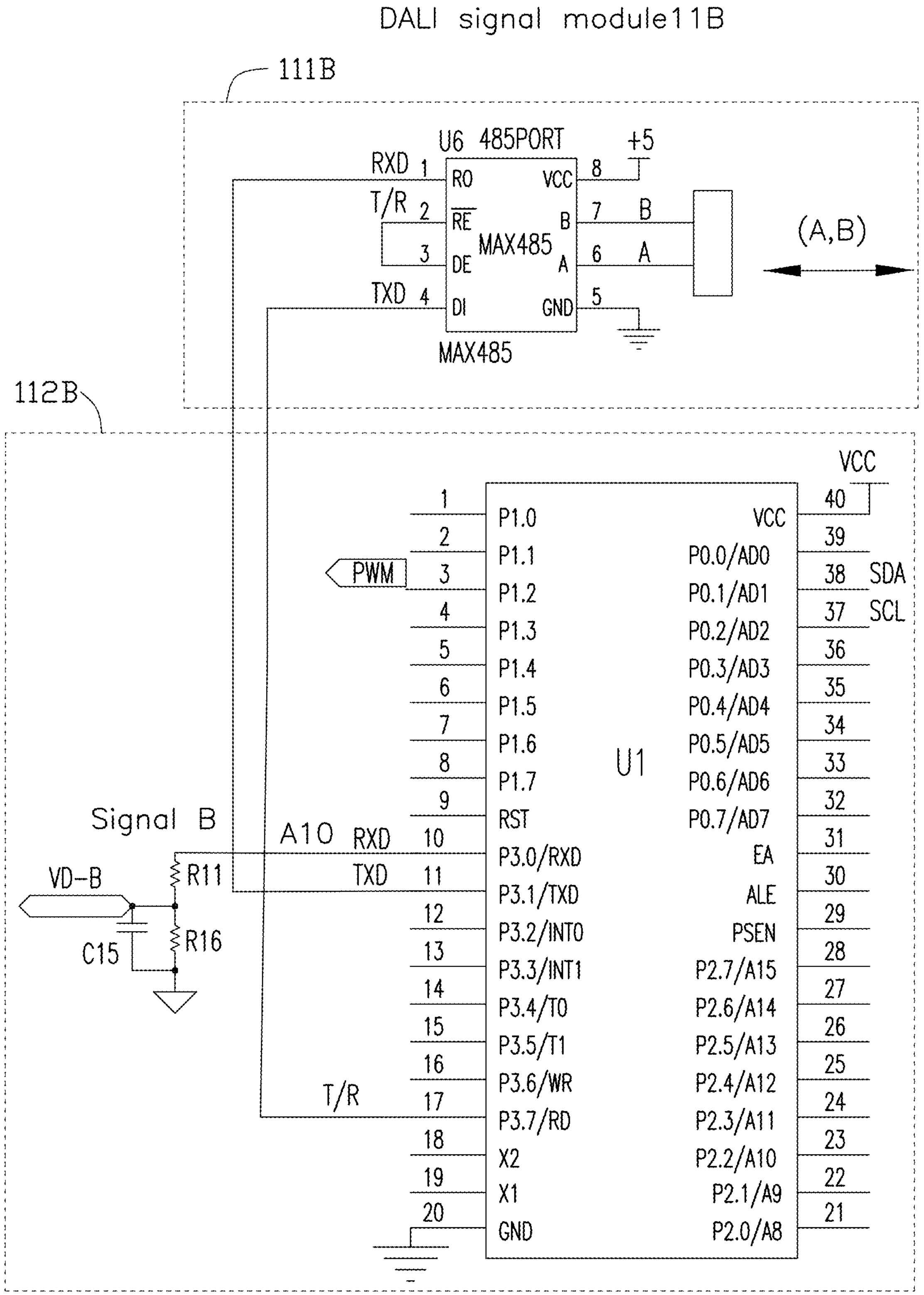
FIG. 4 is a schematic circuit diagram of a DMX signal module of the LED drive system of FIG. 1.

Referring to FIG. 4, in the present disclosure, the detection control module 11 includes a DMX (Digital Multiplex) signal module 11B, wherein the DMX signal module 11B includes: a DMX input module 111B and a DMX data conversion module 112B.

The DMX input module 111B is configured to receive DMX signals (A, B) that comply with a DMX protocol, and convert the DMX signals (A, B) into a pair of level signals (RXD, TXD). In an embodiment of the present disclosure, the DMX signals (A, B) are output to the DMX input module 111B through an external device. When the DMX signals (A, B) are converted by the DMX input module 111B, a 485 digital conversion chip U6 can be provided to convert the DMX signals (A, B) into the pair of level signals (RXD, TXD), for example, the 485 digital conversion chip is a MAX485 chip. The DMX signals (A, B) are input through a sixth pin and a seventh pin, and then output the pair of level signals (RXD, TXD) through a first pin and a fourth pin of the MAX485 chip, and the pair of level signals (RXD, TXD) comply with a 485 data communication protocol, which can be easy to connect and communicate with the DMX data conversion module 112B.

The DMX data conversion module 112B is configured to receive the pair of level signals (RXD, TXD) and convert the pair of level signals (RXD, TXD) into the detection control signals A10 and then output the detection control signals A10, and the detection control signals A10 output from the DMX data conversion module 112B is defined as a second signal (signal B).

In an embodiment of the present disclosure, the DMX data conversion module 112B is configured to output the second signal (signal B) that includes information corresponding to a lighting mode and a lighting intensity according to the DMX signals (A, B) or the pair of level signals (RXD, TXD) corresponding to the lighting mode and the lighting intensity. That is to say, the second signal (signal B) that is output contains all control information of the DMX signals and will not cause a change of the control mode after converting the DMX signal into the second signal (signal B).

Figure 5:
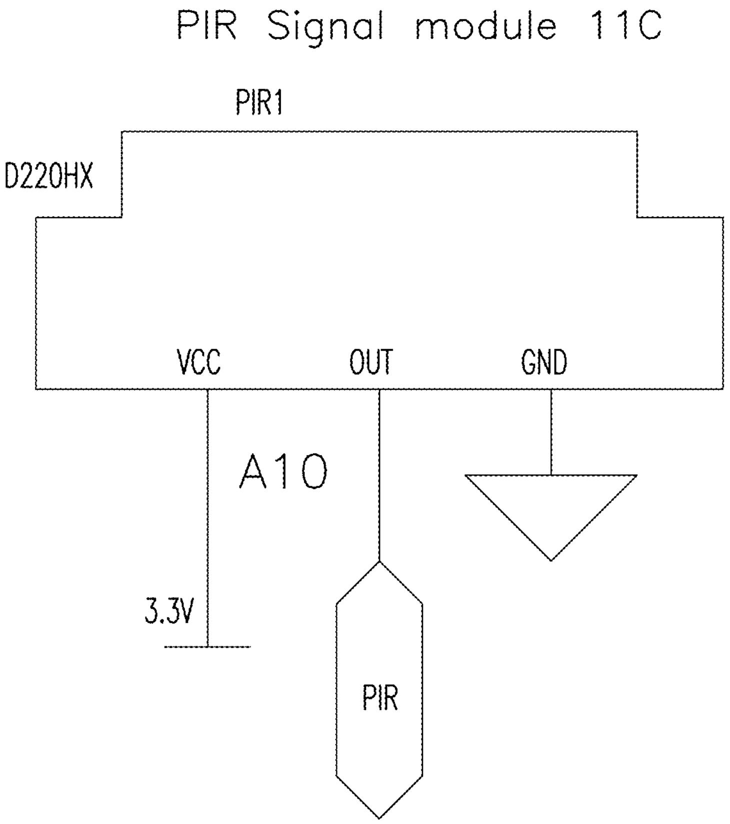
FIG. 5 is a schematic circuit diagram of a PIR signal module of the LED drive system of FIG. 1.

Referring to FIG. 5, in the present disclosure, the detection control module 11 includes a PIR (Passive Infrared Sensor) signal module 11C, wherein the PIR signal module 11C includes: a PIR infrared sensor (PIR1) configured to detect an infrared signal of a surrounding environment, and generate and output the detection control signal A10 based on that the infrared signal is changed. The detection control signal A10 output from the PIR infrared sensor (PIR1) defined as a third signal (PIR).

Figure 6:
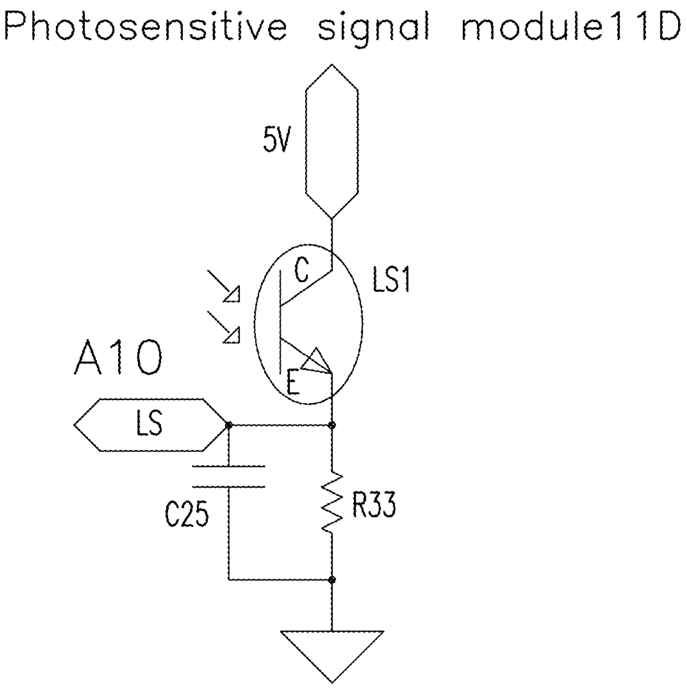
FIG. 6 is a schematic circuit diagram of a photosensitive signal module of the LED drive system of FIG. 1.

Referring to FIG. 6, in the present disclosure, the detection control module 11 further includes a photosensitive signal module 11D, wherein the photosensitive signal module 11D includes: a photosensitive sensor LS1 configured to detect a natural light intensity of the surrounding environment, and generate and output the detection control signal A10 based on the light intensity. The detection control signal A10 output from the photosensitive sensor LS1 defined as a fourth signal (LS).

Figure 7:
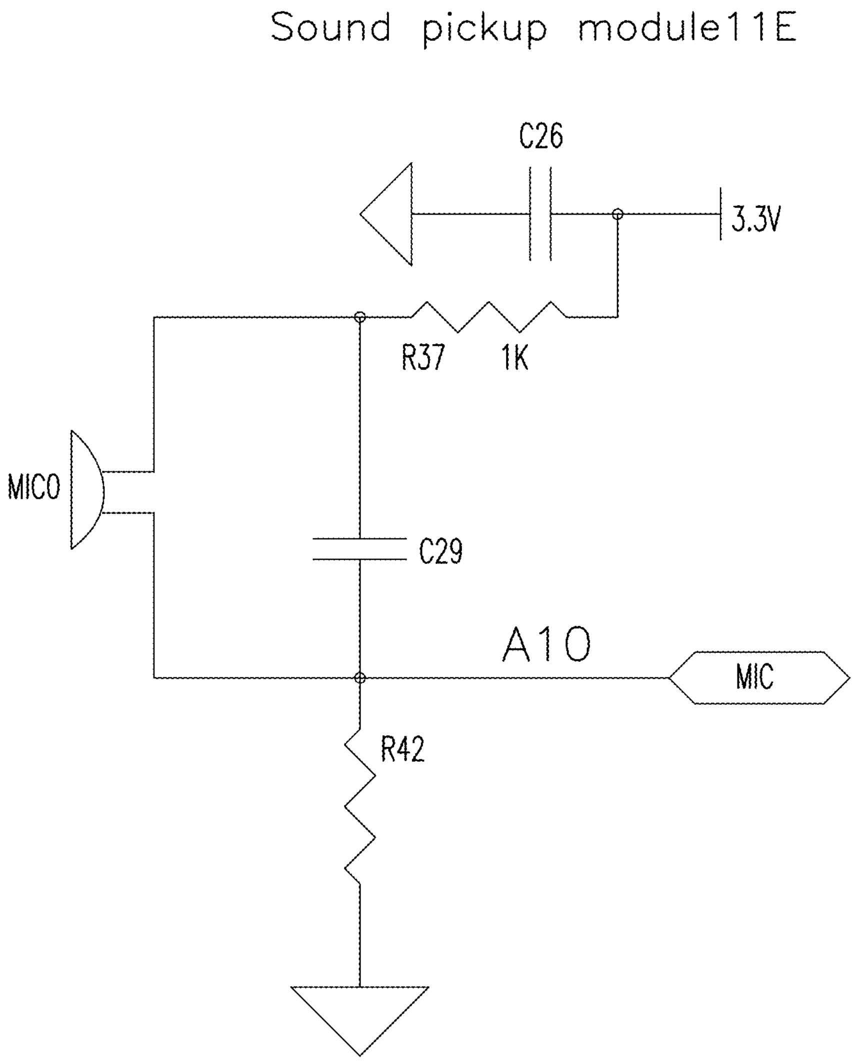
FIG. 7 is a schematic circuit diagram of a sound pickup module of the LED drive system of FIG. 1.

Referring to FIG. 7, in the present disclosure, the detection control module 11 further includes a sound pickup module 11E, wherein the sound pickup module 11E includes a sound sensor MICO configured to obtain a sound of the surrounding environment, and generate and output the detection control signal A10 based on the sound. The detection control signal A10 output from the sound pickup module 11E defined as a fifth signal (MIC).

In the present disclosure, when the detection control module 11 includes five modules that include the DALI signal module, the DMX signal module, the PIR signal module, the photosensitive signal module and the sound pickup module, as shown in FIG. 2 to FIG. 8, the detection control module 11 has five adjusting branches, and the voltages output by the five adjusting branches through the signal output terminals (Fb2) are different, and the first signal (signal A), the second signal (signal B), the third signal (PIR), the fourth signal (LS) and the fifth signal (MIC) output from the five detection control modules 11 are all output to the detection calculation module 13, and the detection calculation module 13 outputs the adjustment signal A20 (Out_SWM) to the drive power supply 21.

Figure 8:
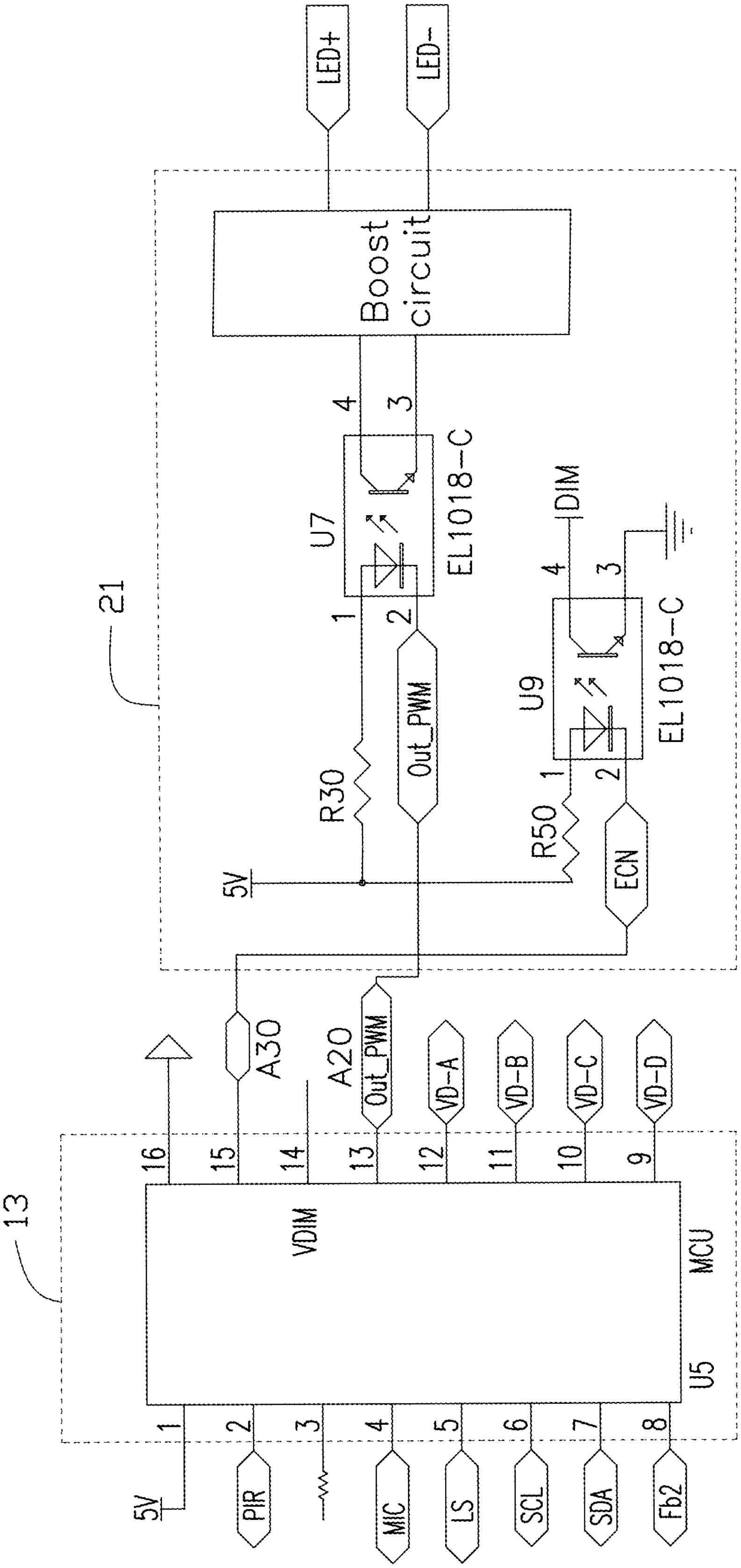
FIG. 8 is a schematic circuit diagram of a detection calculation module of the LED drive system of FIG. 1.

Referring to FIG. 8, a twelfth pin VD-A is configured to receive the first signal (signal A) from the DALI signal module 11A, a eleventh pin VD-B configured to receive the second signal (signal B) from the DMX signal module 11B, a second pin PIR configured to receive the third signal (PIR) from the infrared signal module 11C, a fifth pin LS configured to receive the fourth signal (LS) from the photosensitive signal module 11D, and the fourth pin MIC configured to receive the fifth signal (MIC) from the sound pickup module 11E. Meanwhile, an eighth pin Fb2 is configured to receive different voltages (1.7V, 1.3V, 0.9V, 0.5V, 0.1V) output from the switching adjustment module 12.

Referring to FIG. 8, in another embodiment of the present disclosure, the detection calculation module 13 is also configured to calculate and determine a power control signal (A30) according to the lighting mode corresponding to the detection control signal A10 that is received. The power control signal (A30) is configured to control the driving mode of the drive power supply 21, and output the adjustment signal A20 according to the lighting intensity corresponding to the received detection control signal A10, the adjustment signal A20 configured to control the driving intensity of the drive power supply 21.

That is to say, at this time, the detection calculation module 13 outputs two control signals, namely the power control signal A30 for controlling the driving mode, and the adjustment signal A20 for controlling the driving intensity. A combination of the two signals is configured to achieve a customized and multi-mode lighting mode of the LED lamp 200.

In this case, regardless of whether there are two or more detection control modules 11, the control signals output from the detection calculation module 13 only include the power control signal A30 and the adjustment signal A20, which also achieves compatible control of the plurality of detection control modules 11.

Referring to FIG. 8, in the present disclosure, the drive power supply 21 includes: a drive mode control terminal (ECN) and a drive state adjustment terminal (Out-PWM).

The drive mode control terminal (ECN) is configured to receive the power control signal A30 of the detection calculation module 13 to determine whether the drive power supply 21 drives the LED lamp 200, and a driving interval thereof. The drive state adjustment terminal (Out-PWM) is configured to receive the adjustment signal A20 to determine a driving intensity of the drive power supply 21 when the drive power supply 21 drives the LED lamp 200.

A drive method according to an embodiment of the present disclosure is provided. The drive method includes:

step S1, accessing a plurality of detection control signals, and determining which one or more of a plurality of detection control signals that is accessed, wherein the detection control signal is generated or received by a detection control module and then output from the detection control module; and step S2, converting the detection control signal into an adjustment signal and outputting the adjustment signal, the plurality of different detection control signals having different data formats and different data input terminals, and the adjustment signals having the same output formats and/or the same output terminals to achieve compatibility of the detection control module.

When the plurality of detection control signals is converted, there are different conversion modes according to the different data formats and the different data input terminals. The conversion adjustment signals that are output are all PWM signals.

The detection control signal corresponds to the lighting mode and the lighting intensity of the drive power supply, the adjustment signal configured to control the driving intensity and the driving mode of the drive power supply, wherein the driving mode of the drive power supply corresponds to the lighting mode of the LED lamp, and the driving intensity of the drive power supply corresponds to the lighting intensity of the LED lamp.

The step S2 further includes:

step S21, when the detection control signal is converted into the adjustment signal and is output, the detection control signal further configured to be converted into a power control signal, the power control signals converted from the different detection control signals have the same output formats and/or the same output terminals to achieve compatibility of the detection control module; and the power control signal configured to determine whether the drive power supply is driven and a driving interval thereof, to control the driving mode of the drive power supply.

There is a plurality of detection control signals that is accessed. When the plurality of detection control signals is converted into the adjustment signals to output the adjustment signals, the lighting mode and the lighting intensity corresponding to the plurality of detection control signals are determined and calculated, so as to be converted into the corresponding power control signals and the adjustment signals.

Figure 9:
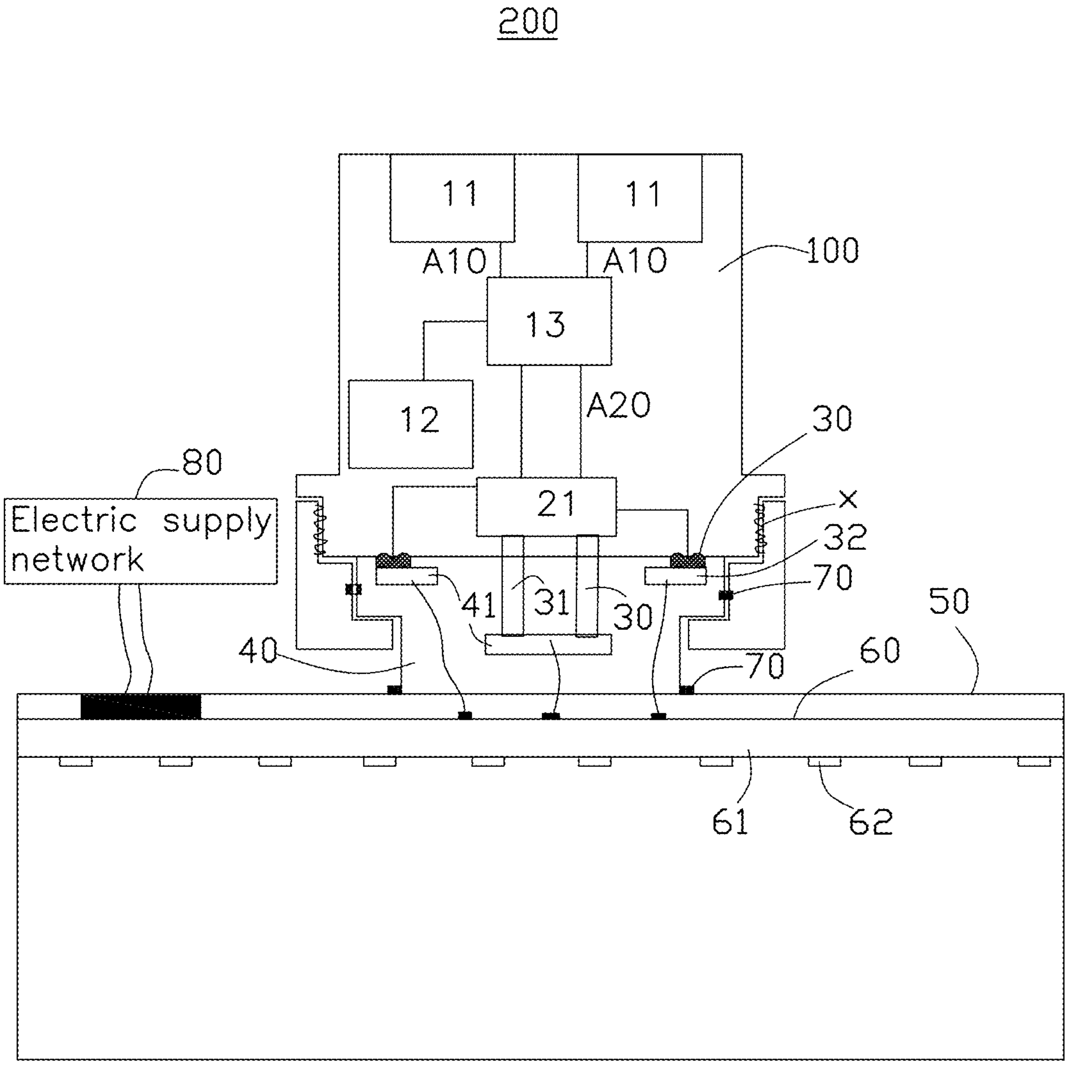
FIG. 9 is a schematic view of an LED lamp in accordance with an embodiment of the present disclosure.

Referring to FIG. 9, an LED lamp 200 according to an embodiment of the present disclosure is provided. The LED lamp 200 includes an LED controller 100, a connecting seat 40 and a body 50.

The LED controller 100 includes a plurality of detection control modules 11, a switching adjustment module 12, a detection calculation module 13 and a drive power supply 21.

The detection control module 11 is configured to generate or receive detection control signals A10 and then output the detection control signals A10, the detection calculation module 13 configured to selectively receive one of the plurality of detection control signals A10 based on an adjustment trigger of the switching adjustment module 12, and convert the detection control signals A10 that has been received into adjustment signals A20 to output to the drive power supply 21. The drive power supply 21 is configured to control an output of the adjustment signal A20 to the drive power supply 21; the drive power supply 21 controls the output through the conductive metal pin 30 according to the adjustment signal A20 to achieve an adjustment of the lighting mode and the lighting intensity of the LED lamp 200.

The connecting seat 40 includes a metal contact 41 arranged thereon. An illumination module 60 is received in the body 50 and electrically connected to the metal contact 41. The illumination module 60 includes a lighting board 61 and lighting beads 62 arranged on the lighting board 61.

The LED controller 100 is connected with the connecting seat 40 in a plug-in manner, and the conductive metal pin 30 is in contact with the metal contact 40 to conduct electricity therebtween, wherein the LED controller 100 is configured to drive the illumination module 60 inside the body 50 through the metal contact 41 of the connecting seat 40, and control a lighting mode and a lighting intensity of the illumination module 60.

The LED controller 100 is pluggable and electrically connected to the connecting seat 40. An output terminal of the LED controller 100 and the output format of the adjustment signal A20 output from the output terminal are independent from the number or the type of the detection control module 11, in order to achieve compatible data output thereof. At this time, the adjustment signal A20 received by the drive power supply 21 is a control signal with the same data protocol, which facilitates control thereof.

The plurality of detection control modules 11 are different, and the plurality of detection control signals A10 output from the plurality of detection control modules 11 are different.

When the detection control signals A10 input by the detection calculation module 13 come from different detection control modules 11, the adjustment signals A20 output from the detection calculation module 13 have the same output formats and/or the same output terminals to achieve compatible data output thereof.

The adjustment signal A20 is a PWM modulation signal.

Referring to FIG. 3 to FIG. 7, the detection control module 11 includes at least two of a DALI signal module 11A, a DMX signal module 11B, a PIR signal module 11C, a photosensitive signal module 11D and a sound pickup module 11E. the DALI signal module 11A is configured to receive a DALI signal that complies with a DALI protocol, the DMX signal module 11B configured to receive DMX signals (A, B) that comply with a DMX protocol, the PIR signal module 11C configured to detect an infrared signal of a surrounding environment, the photosensitive signal module 11D configured to detect a natural light intensity of the surrounding environment, and the sound pickup module 11E configured to obtain a sound of the surrounding environment.

Referring to FIG. 9, waterproof measures are provided between the LED controller 100 and the connecting seat 40, as well as between the connecting seat 40 and the body 50. Specifically, a waterproof adhesive strip 70 can be provided for achieving waterproofing thereof.

Referring to FIG. 9, the LED controller 100 and the connecting seat 40 are connected with each other by a screw thread x.

Figure 10:
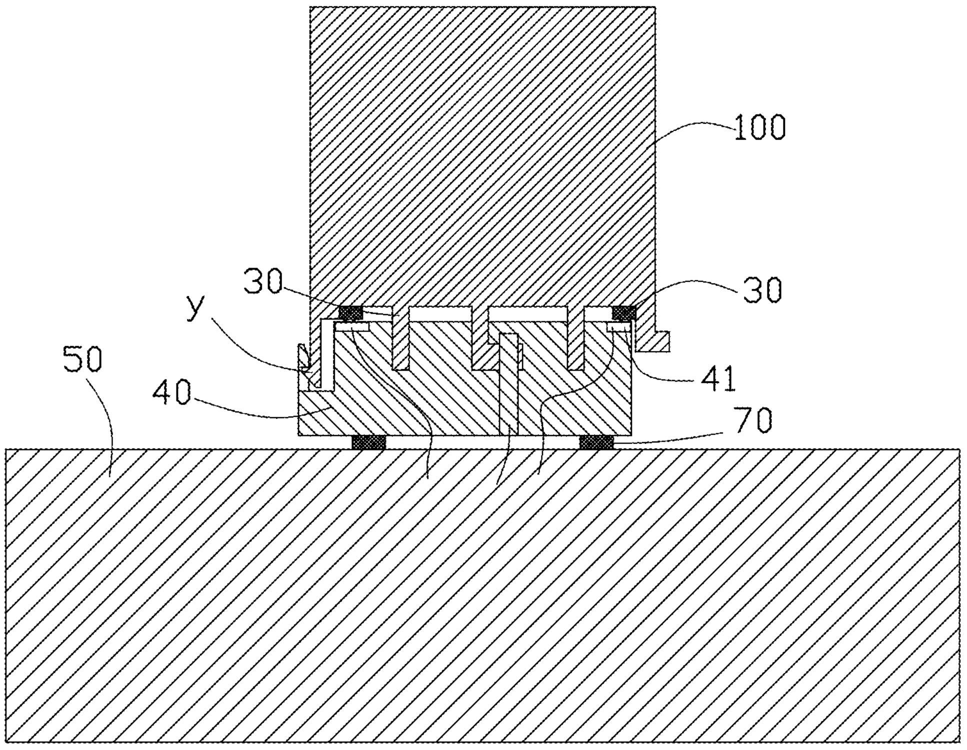
FIG. 10 is a cross-sectional view of the LED lamp of the present disclosure.
Figure 11A:
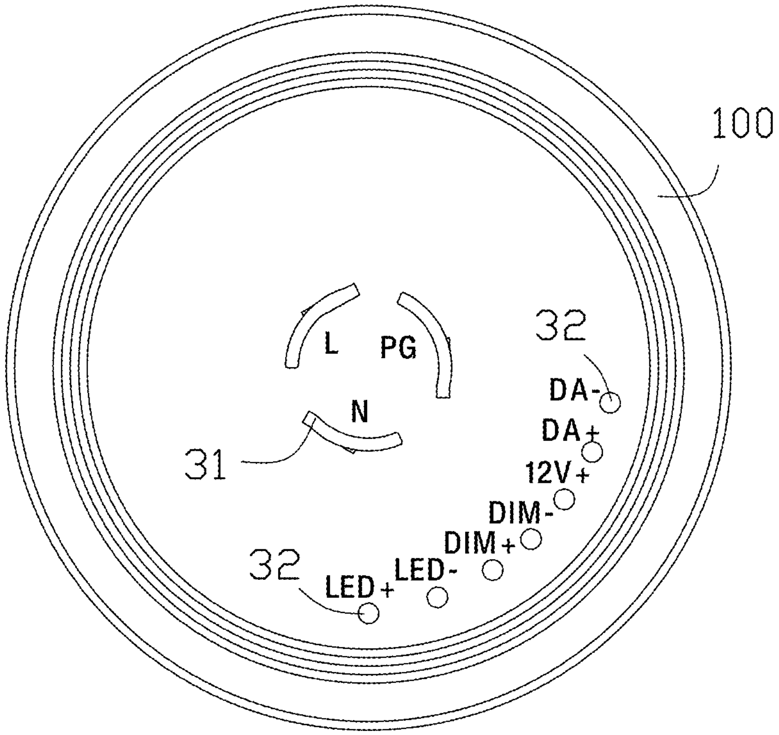
FIG. 11A to FIG. 11D are schematic views of an LED controller with different numbers of conductive metal pins thereof.
Figure 11B:
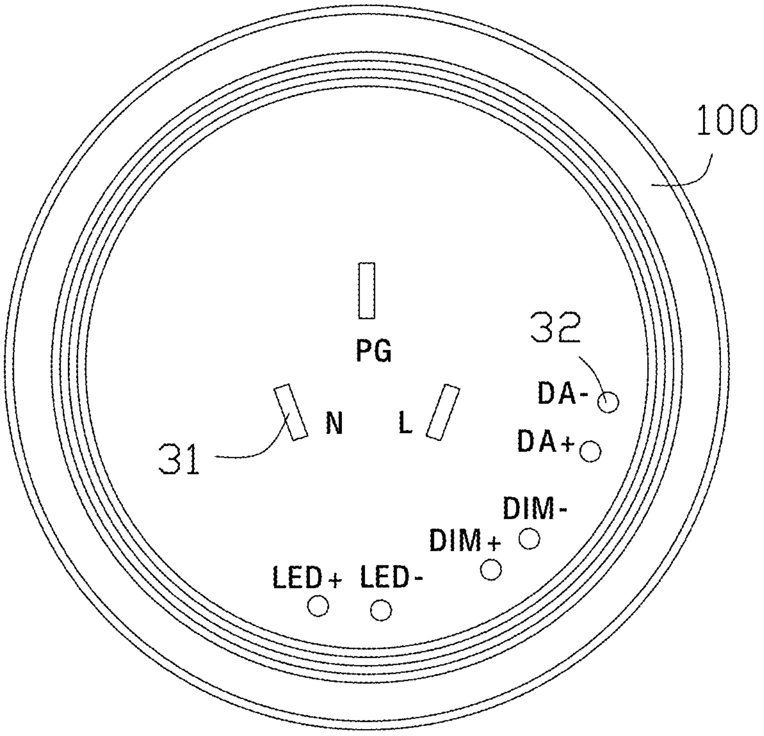
Figure 11C:
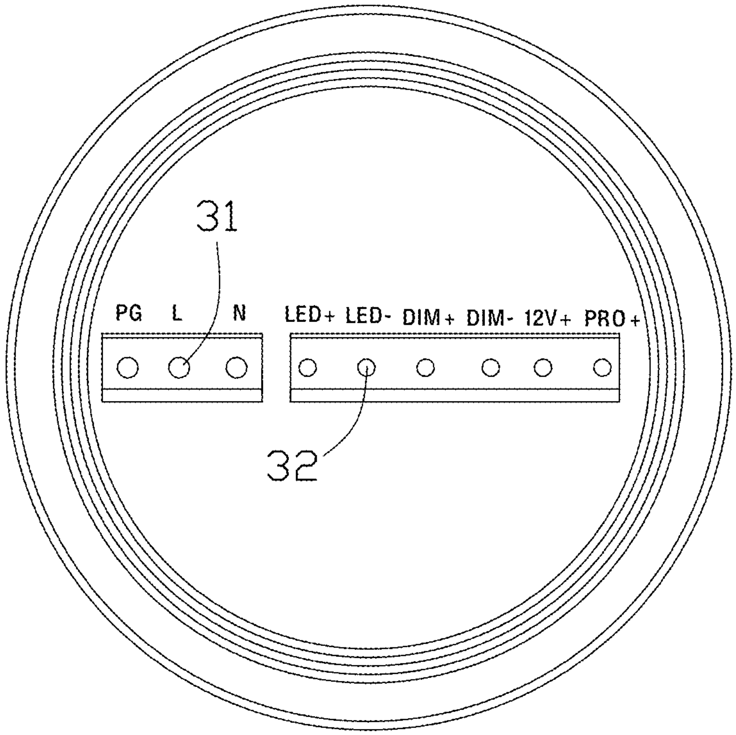
Figure 11D:
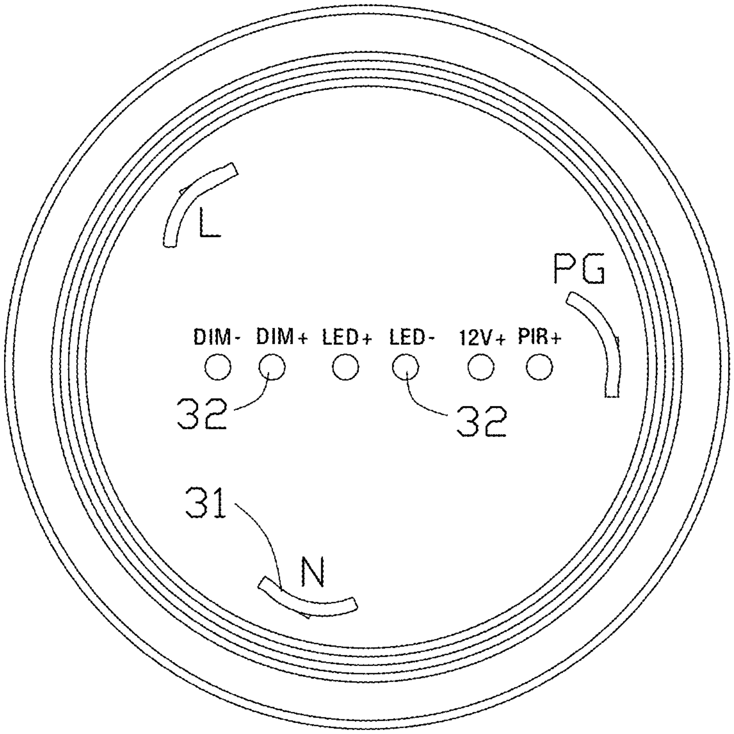

Referring to FIG. 10, the LED controller 100 and the connecting seat 40 are connected with each other by a buckle y or a vertically plug-in way.

Referring to FIG. 9 and FIGS. 11*a*-11*d*, the conductive metal pin 30 includes a drive needle 31 configured to receive a mains power and a control needle 32 configured to output a control signal, the body 50 connected to an electric supply network 80, and the drive power supply 21 configured to take a power from the electric supply network 80 through the drive needle 31.

FIG. 11A to FIG. 11D are top views of the LED controller 100, which can differentially set a plurality of output signal pins 32 according to the number of detection control modules 11 that includes receivers or sensors inside the LED controller 100; The number of signal pins 32 corresponds to that of detection control modules 11.

What is claimed is:

1. An LED drive system comprising a drive power supply, wherein the LED drive system further comprises: an LED controller installed with an LED lamp in a plug-in manner, wherein when the LED controller is plugged, the LED controller obtains a power from the LED lamp to start working; and wherein the LED controller comprises:

a plurality of detection control modules is different with each other and configured to generate detection control signals to output or receive detection control signals to output, and the detection control signals output by the plurality of detection control modules are different;

a switching adjustment module;

a detection calculation module connected to both the switching adjustment module and the detection control module in a conductive manner, and configured to select one of a plurality of detection control signals output from the plurality of detection control modules to be received under an adjustment trigger of the switching adjustment module, and converts the detection control signal that has been received into an adjustment signal to output to the drive power supply, the drive power supply configured to drive a lighting mode and a lighting intensity of the LED lamp according to the adjustment signal that has been received; and wherein when the detection control signals that are received by the detection calculation module come from different detection control modules, the adjustment signals output from the detection calculation modules have the same output formats and/or the same output terminals to achieve compatibility of the plurality of detection control modules; and wherein the switching adjustment module is configured to adjust an own resistance value thereof to output voltages with different sizes, the detection calculation module configured to obtain the detection control signal corresponding to the voltage from the plurality of detection control modules that is electrically connected to the detection calculation module itself based on the voltages with different sizes input by the switching adjustment module; and wherein the detection control module comprises a DALI (Digital Addressable Lighting Interface) signal module, the DALI signal module comprising:

a DALI input terminal configured to receive a DALI signal that complies with a DALI protocol;

a DALI pre-processing module configured to perform optocoupler isolation on the DALI signal and achieve time-division asynchronous bidirectional communication, to generate an asynchronous signal thereof;

a DALI data conversion module configured to receive or output the asynchronous signal to achieve a communication with a DALI input terminal, and convert the asynchronous signal that is received into the detection control signal to output the detection control signal; and wherein the detection control signal output from the DALI data conversion module is defined as a first signal (signal A); and wherein the DALI data conversion module is configured to output the first signal (signal A) that comprises information corresponding to a lighting mode and a lighting intensity according to the DALI signal or the asynchronous signal corresponding to the lighting mode and the lighting intensity.

2. The LED drive system as claimed in claim 1, wherein the detection control module comprises a DMX (Digital Multiplex) signal module, wherein the DMX signal module comprises:

a DMX input module configured to receive DMX signals (A, B) that comply with a DMX protocol, and convert the DMX signals (A, B) into a pair of level signals (RXD, TXD);

a DMX data conversion module configured to receive the pair of level signals (RXD, TXD) and convert the pair of level signals (RXD, TXD) into the detection control signals and then output the detection control signals, and the detection control signals output from the DMX data conversion module is defined as a second signal (signal B); and the DMX data conversion module is configured to output the second signal (signal B) that comprises information corresponding to a lighting mode and a lighting intensity according to the DMX signals or the level signals corresponding to the lighting mode and the lighting intensity.

3. The LED drive system as claimed in claim 2, wherein the detection control module comprises a PIR (Passive Infrared Sensor) signal module, wherein the PIR signal module comprises:

a PIR infrared sensor configured to detect an infrared signal of a surrounding environment, and generate and output the detection control signal based on that the infrared signal is changed; and the detection control signal output from the PIR infrared sensor defined as a third signal (PIR).

4. The LED drive system as claimed in claim 3, wherein the detection control module comprises a photosensitive signal module, wherein the photosensitive signal module comprises:

a photosensitive sensor configured to detect a natural light intensity of the surrounding environment, and generate and output the detection control signal based on the light intensity; and the detection control signal output from the photosensitive sensor defined as a fourth signal (LS).

5. The LED drive system as claimed in claim 4, wherein the detection control module comprises:

a sound pickup module comprising a sound sensor configured to obtain a sound of the surrounding environment, and generate and output the detection control signal based on the sound; and the detection control signal output from the sound pickup module defined as a fifth signal (MIC).

6. The LED drive system as claimed in claim 5, wherein the switching adjustment module comprises a plurality of adjusting branches connected in parallel to each other, a control output terminal (Fb2) formed at an end of a parallel connection point thereof and configured to output the voltages with different sizes to the detection operation module; and wherein the number of adjusting branches is the same as that of detection control modules, and each adjusting branch corresponds to one detection control module; and wherein the adjusting branch comprises an adjusting switch and an adjusting resistor connected in series to the adjusting switch, wherein the adjusting resistors of the plurality of adjusting branches have different values from each other, wherein when the adjusting switch is turned off and the corresponding adjusting branch is turned on, the adjusting branch outputs a corresponding voltage to the detection calculation module.

7. The LED drive system as claimed in claim 6, wherein the detection calculation module is electrically connected to a signal output terminal (Fb2), configured to select any one of the first signal (signal A), the second signal (signal B), the third signal (PIR), the fourth signal (LS) and the fifth signal (MIC) to be received based on the voltage output from the signal output terminal (Fb2), and determine a power control signal based on a lighting mode corresponding to the detection control signal that has been received; the power control signal configured to control the driving mode of the drive power supply to further control a lighting mode of the LED lamp, and the detection and calculation module output the adjustment signal according to the lighting intensity corresponding to the first signal (signal A), the second signal (signal B), the third signal (PIR), the fourth signal (LS) and the fifth signal (MIC), and the adjustment signal configured to control the driving intensity of the drive power supply so as to control the lighting intensity of the LED lamp; and wherein the adjustment signal is a PWM (Pulse Width Modulation) signal.

8. The LED drive system as claimed in claim 7, wherein the drive power supply comprises:

a drive mode control terminal (ECN) configured to receive the power control signal of the detection calculation module to determine whether the drive power supply drives the LED lamp, and a driving interval thereof, wherein whether the drive power supply drives the LED lamp and the driving interval are formed the driving mode; and a drive state adjustment terminal (OUT-PWM) configured to receive the adjustment signal to determine the driving intensity of the drive power supply when the drive power supply drives the LED lamp.

9. An LED drive method comprising:

step S1, providing a plurality of detection control modules different with each other and outputting different detection control signals, accessing a plurality of detection control signals, and determining which one or more of a plurality of detection control signals that is accessed, wherein the detection control signal is generated or received by a detection control module and then output from the detection control module;

step S2, selecting one of the plurality of detection control signals by a switching adjustment module, selecting the detection control signal to be received by a detection calculation module under an adjustment trigger of the switching adjustment module, converting the detection control signal into an adjustment signal and outputting the adjustment signal, the plurality of different detection control signals having different data formats and different data input terminals, and the adjustment signals having the same output formats and/or the same output terminals to achieve compatibility of the detection control module;

step S3, adjusting an own resistance value of the switching adjustment module to output voltages with different sizes, obtaining the detection control signal corresponding to the voltage from the plurality of detection control modules that is electrically connected to the detection calculation module itself based on the voltages with different sizes input by the switching adjustment module; and step S4, receiving a DALI signal that complies with a DALI protocol, performing optocoupler isolation on the DALI signal and achieving time-division asynchronous bidirectional communication, to generate an asynchronous signal thereof, receiving or outputting the asynchronous signal to achieve a communication with a DALI input terminal, converting the asynchronous signal that is received into the detection control signal to output the detection control signal, defining the detection control signal that is output as a first signal (signal A), and outputting the first signal (signal A) that comprises information corresponding to a lighting mode and a lighting intensity according to the DALI signal or the asynchronous signal corresponding to the lighting mode and the lighting intensity.

10. The LED drive method as claimed in claim 9, wherein when the plurality of detection control signals is converted, there are different conversion modes according to the different data formats and the different data input terminals, the plurality of detection control signals is converted to output adjustment signals with the same PWM signals.

11. The LED drive method as claimed in claim 10, wherein the detection control signal corresponds to the lighting mode and the lighting intensity of the LED lamp, the adjustment signal configured to control the driving intensity and the driving mode of the drive power supply, the driving mode corresponding to the lighting mode of the LED lamp, and the driving intensity corresponding to the lighting intensity of the LED lamp, wherein the step S2 further comprises:

step S21, when the detection control signal is converted into the adjustment signal and is output, the detection control signal further configured to be converted into a power control signal, the power control signals converted from the different detection control signals have the same output formats and/or the same output terminals to achieve compatibility of the detection control module; and the power control signal configured to determine whether the drive power supply is driven and a driving interval thereof, to control the driving mode of the drive power supply.

12. The LED drive method as claimed in claim 11, wherein there is a plurality of detection control signals that is accessed; when converting the plurality of detection control signals into the adjustment signals and outputting the adjustment signals, determining and calculating the driving mode and the driving intensity corresponding to the plurality of detection control signals so as to correspondingly convert into the power control signals and the adjustment signals.

13. An LED lamp comprising:

an LED controller comprising a plurality of detection control modules, a switching adjustment module, a detection calculation module and a drive power supply, the detection control module configured to generate or receive detection control signals and then output the detection control signals, the detection calculation module configured to selectively receive one of the plurality of detection control signals based on an adjustment trigger of the switching adjustment module, and convert the detection control signal that has been received into an adjustment signal to output to the drive power supply; the drive power supply configured to control and output a driving signal through a conductive metal pin according to the adjustment signal to achieve an adjustment of a lighting mode and a lighting intensity of the LED lamp;

a connecting seat with a metal contact being arranged thereon;

a body comprising an illumination module received therein, the illumination module electrically connected to the metal contact; and wherein the LED controller is connected with the connecting seat in a plug-in manner, and the conductive metal pin is in contact with the metal contact to conduct electricity therebetween, wherein the LED controller is configured to drive the illumination module inside the body through the metal contact of the connecting seat, and control a lighting mode and a lighting intensity of the illumination module; and wherein the plurality of detection control modules is different, and the plurality of detection control signals output from the plurality of detection control modules are different; and wherein when the detection control signals input by the detection calculation module come from different detection control modules, the adjustment signals output from the plurality of detection control modules have the same output formats and/or the same output terminals to achieve compatibility of the plurality of detection control modules; and wherein the detection control module comprises a DALI signal module, a DMX signal module, a PIR signal module, a photosensitive signal module and a sound pickup module;

the DALI signal module configured to receive a DALI signal that complies with a DALI protocol;

the DMX signal module configured to receive DMX signals (A, B) that comply with a DMX protocol;

the PIR signal module configured to detect an infrared signal of a surrounding environment;

the photosensitive signal module configured to detect a natural light intensity of the surrounding environment; and the sound pickup module configured to obtain a sound of the surrounding environment.

14. The LED lamp claimed in claim 13, wherein waterproof measures are provided between the LED controller and the connecting seat, as well as between the connecting seat and the body.

15. The LED lamp as claimed in claim 13, wherein controller and the connecting seat are connected with each other by a threaded tightening way or a snap fit way or a vertically plug-in way.

16. The LED lamp as claimed in claim 15, wherein the conductive metal pin comprises a drive needle configured to receive a mains power and a control needle configured to output a control signal, the body connected to an electric supply network, and the drive power supply configured to take a power from the electric supply network through the drive needle.

* * * * *